United States Patent
Schellhorn

(10) Patent No.: US 7,119,910 B1
(45) Date of Patent: Oct. 10, 2006

(54) PHASE SHIFTING WAVEFRONT INTERFERENCE METHOD

(75) Inventor: Uwe Schellhorn, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 296 days.

(21) Appl. No.: 10/697,239

(22) Filed: Oct. 31, 2003

(51) Int. Cl.
G01B 11/02 (2006.01)

(52) U.S. Cl. ..................................... 356/512
(58) Field of Classification Search ............... 356/450, 356/511, 512, 513, 514, 521
See application file for complete search history.

(56) References Cited

U.S. PATENT DOCUMENTS

| 2002/0001088 A1 | 1/2002 | Wegmann, et al |
| 2005/0264827 A1 | 12/2005 | Schriever et al. |

FOREIGN PATENT DOCUMENTS

DE 101 09 929 A1 11/2001

OTHER PUBLICATIONS

J.E. Greivenkamp and J.H. Bruning, "Phase Shifting Interferometers", in D. Malacara ed., Optical Shop Testing, Second Edition, John Wiley & Sons, 1992, Chapter 14.

Primary Examiner—Layla G. Lauchman
Assistant Examiner—Michael A. Lyons
(74) Attorney, Agent, or Firm—Sughrue Mion, PLLC

(57) ABSTRACT

A phase shifting wavefront superimposition method in which the intensities of superimposition patterns of object wavefront and reference wavefronts produced successively in time with respective phase shifts by predefinable phase steps are registered for a respective predefinable location and, from the registered intensities, an object-induced phase difference between object wavefront and reference wavefront is determined for the respective location. Phase step errors in the successively produced superimposition patterns are determined by means of a spatial superimposition pattern evaluation and taken into account correctively in the determination of the object-induced phase difference. The method is used for example, in wavefront measurement of optical imaging systems by means of phase shifting interferometry for the purpose of highly accurate determination of imaging errors.

5 Claims, 2 Drawing Sheets

PHASE SHIFTING WAVEFRONT INTERFERENCE METHOD

Figure 1:
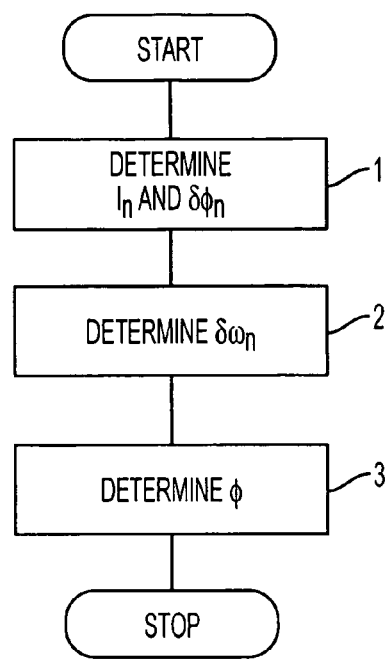

The invention relates to a phase shifting wavefront superimposition method, in which the intensity of superimposition patterns of object wavefronts and reference wavefronts produced successively in time with respective phase shifts by predefinable phase steps is registered for a respectively predefinable location and, from the registered intensities, an object-induced phase difference between the object and reference wavefronts at this location is determined.

Wavefront superimposition methods of this type are usual, for example using Moiré techniques and two-beam interferometer or shearing interferometry techniques. One important area of application relates to measuring high-resolution optical imaging systems with regard to aberrations, such as projection objectives for microlithography projection exposure installations for semiconductor wafer structuring.

Typically, the superimposition patterns of object and reference wavefronts, produced by such methods, comprise a normally strip-like spatial intensity distribution pattern, the intensity being modulated periodically by phase shifting. The phase is determined separately at the individual locations from appropriate mathematical relationships. By means of suitable selection of the method parameters involved, such as period number and step number, and of what are known as apodisation weights, which can be represented as complex numbers and describe the influence of the intensity value of each measurement step on the phase at the relevant location, systematic errors, such as undersampling, harmonics and scaling errors of a phase shifter used can generally be suppressed adequately. High frequency vibrations, which can occur in the measurement structure, are averaged out, normally with a loss of contrast, and are only of subordinate importance, as long as they are considerably faster than the measurement or exposure time. In the same way, drift phenomena can be neglected, as long as they are considerably slower than the entire measurement or exposure time.

Conventional methods of the type mentioned at the beginning, including familiar associated error correction methods are described, for example, in the textbook by D. Malacara, Optical Shop Testing, $2^{nd}$ ed, John Wiley & Sons, Inc., 1992 and in the literature cited there, to which reference can be made for further details, see in particular the chapters about Moiré techniques and phase shifting interferometry, like Chapter 14 with the heading "Phase Shifting Interferometry".

As opposed to high frequency vibrations and drift phenomena, stochastic phase step errors which, for example, are caused by low frequency vibrations in the measurement structure or control fluctuations or oscillations from the surroundings, impair the measurement accuracy significantly.

The invention is based, as a technical problem, on the provision of a phase shifting wavefront superimposition method of the type mentioned at the beginning which, with relatively little outlay, offers a comparatively high measurement accuracy, even given the occurrence of stochastic phase step errors which fall into the measurement time window and which, for example, result from low frequency vibrations in the measurement structure.

The invention solves this problem by providing a phase shifting wavefront superimposition method of the type mentioned at the beginning wherein, to determine the object-induced phase difference, phase step errors which occur in the superimposition patterns produced successively are taken into account correctively, the phase step errors being determined by means of a spatial superimposition pattern evaluation.

The method according to the invention in this way combines the technique of time phase shifting which, as is known, offers high resolution and therefore measurement accuracy, with the technique of spatial evaluation of the typically strip-like superimposition patterns, the last-named technique being comparatively insensitive with respect to time fluctuations in the time window of the measurement time. By means of the spatial superimposition pattern evaluation, any phase step errors of the phase shifting operation are determined and are then taken into account correctively in the evaluation of the phase shifting operation. Alternatively or additionally to a strip pattern evaluation, the superimposition pattern evaluation can include the measure of predefining specific initial phase variations in the object wavefront and/or the reference wavefront.

The method according to the invention can be implemented both as a Moiré technique and also as an actual interferometry technique in the narrower sense of the word, the intention being in the present case for simplicity for the term "phase shifting interferometry" also to cover the corresponding Moiré techniques. For the method according to the invention, both techniques with stepwise phase shifting and techniques with continuous phase shifting can be used.

In an advantageous development of the invention, predefined phase jumps in a one-dimensionally or multi-dimensionally periodic structure are used to produce the object wavefront or the reference wavefront when determining the phase step errors. By means of a suitable selection of these phase jumps, the strip density for the spatial superimposition evaluation can be set in a defined manner, in order to make the spatial strip evaluation easier and in order to prevent very many strips making the evaluation more difficult.

In a further configuration of the invention, the corrective action of taking the phase shift error into account includes a compensating determination of corrective contributions to apodisation weights in the mathematical functional relationship of the object-induced phase difference as a function of the superimposition pattern intensities.

Figure 2:
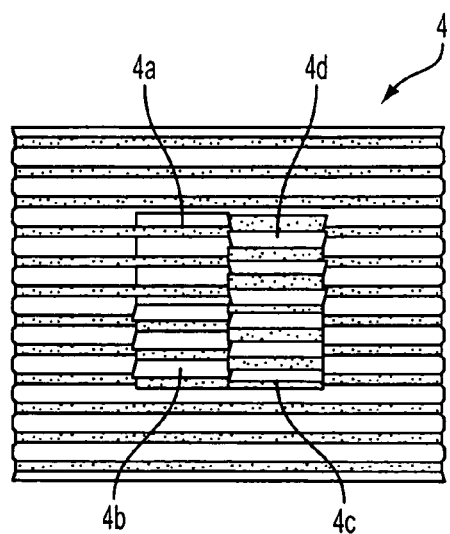
Figure 3:
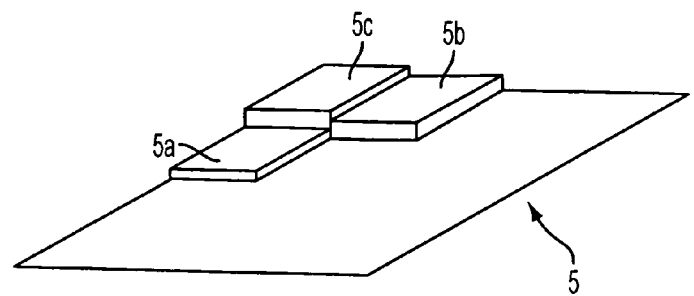
Figure 4:
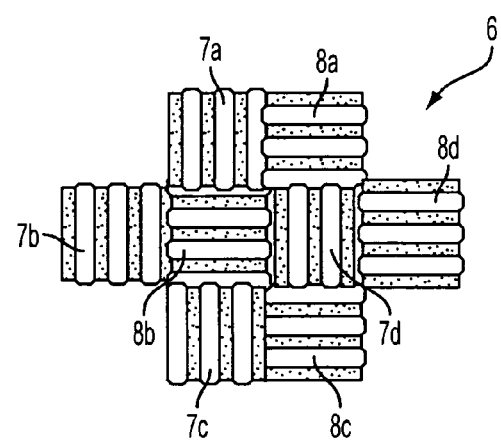
Figure 5:
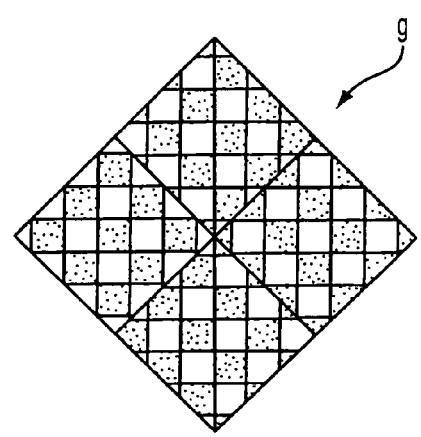

Advantageous embodiments of the invention are illustrated in the drawings and will be described below. Here:

FIG. 1 is a flowchart of a phase shifting wavefront superimposition method with phase step error correction, FIG. 2 is a plan view of a linear grid with predefined phase jumps for producing object or reference wavefronts in the method of FIG. 1, FIG. 3 is a schematic, perspective view of a detail of an interferometer mirror with predefined phase jumps for producing object or reference wavefronts in the method of FIG. 1, FIG. 4 is a plan view of a detail of a parquet grid with predefined phase jumps for producing object or reference wavefronts in the method of FIG. 1, and FIG. 5 is a view corresponding to FIG. 4 for a checkerboard grid variant.

The method of which the sequence is illustrated schematically in FIG. 1 is based on superimposing wavefronts by means of a phase shifting interferometry or Moiré measuring technique, forming a corresponding superimposition pattern, also referred to as an interferogram in the present case. The interfering wavefronts can, for example, be produced in an interferometer or by means of diffraction at Moiré grating structures. The method may be used in particular for the highly precise measurement of high-resolution imaging systems with regard to imaging errors, such as aberrations or distortion errors. The method can be used specifically for highly accurate imaging error determination in high-resolution projection objectives in microlithographic projection exposure installations, for which purpose appropriate apparatus is known in the prior art and therefore requires no further explanation, see for example, measurement apparatus based on shearing interferometry, as disclosed in the laid-open specification DE 101 09 929 A1, which corresponds to U.S. 2002/0001088A1 and the German patent application 102 17 242.0, which corresponds to U.S. 2005/0264827A1, from the applicant, which is not a prior publication. In such measuring apparatus, the optical imaging system to be measured functions as an object, so that the object wavefront supplied by it carries the imaging error information which then, following superimposition of the object wavefront with the reference wavefront, can be extracted from the superimposition pattern as object-induced phase difference information.

As usual, in phase shifting wavefront superimposition methods, the intensity $I_n$ of an interferogram for a respective phase step n is modulated periodically by a phase shift increment $\phi_n = 2\pi np/N$, with the parameters period number p and step number N. The phase $\phi$ is determined separately at each individual location from a suitable mathematical relationship which can normally be traced back to an equation of the form $$\phi = \arg \sum_{n=1}^{N} \omega_n I_n$$

with what are known as apodisation weights $\omega_n$, which represent complex numbers. By means of a suitable selection of the parameters comprising period number p and step number N and the complex apodisation weights $\omega_n$, systematic errors, such as undersampling, harmonics and scaling errors of a phase shifter used in the associated apparatus can be suppressed adequately. Furthermore, high-frequency vibrations, which are considerably faster than the exposure time, that is to say the measurement time, and also drift phenomena, which are considerably slower than the entire measurement time, can be neglected. On the other hand, the measurement accuracy is influenced considerably by stochastic phase step errors $\delta\phi_n$, as are caused in the measurement structure, for example by low frequency vibrations or control fluctuations or coupling with non-steady state environment.

The method shown in FIG. 1 is used to register such phase step errors $\delta\phi_n$ and to take them into account correctively when determining the object-induced phase difference. In the application of measuring optical imaging systems, in this way the influence of such phase step errors $\delta\phi_n$ on the imaging error information to be obtained by evaluation of the object-induced phase difference can be compensated for, completely or in any case partially.

In a first method step 1, the interferogram intensities $I_n$ and the phase step errors $\delta\phi_n$ are registered. No such high requirements need to be placed on the accuracy of the registration of the phase step errors $\delta\phi_n$ as on the determination of the actual phase $\phi$, since the errors are propagated sufficiently weakly in the evaluation of the initial phase.

Therefore, to register the phase step errors, it is sufficient to determine spatially the phase in the interferogram from the superimposition pattern, typically a corresponding strip pattern. This can be done, for example, in accordance with the known four-step formula, in that, in the above equation, instead of the phase step index, use is made of an index n' of the spatial coordinate of the p/N-th fraction of a strip (or other feature of the spatial superimposition pattern) and, for example, the period number p=1 and the step number N=4 with complex apodisation weights $\omega_n = i^{n'}$ are selected, that is to say the index n' relates to spatial phase variation (strip pattern) and the index n relates to time phase variation (phase shifting). The difference between the nth phase from the superimposition pattern and the expected nth phase shift gives the searched-for phase step error $\delta\phi_n$.

This difference has to be determined at at least one location in the superimposition pattern. In the case of tilting in the interferogram, a plurality of location reference points are needed. Ideally, a linear profile is expected, which is determined by means of linear regression over the entire field of the superimposition pattern. If non-linear profiles are expected, for example as a result of aberrations in the optical imaging system to be measured, these are determined by means of suitably adapted regression.

In some applications, it may be that many strips can occur in the superimposition pattern and disrupt the actual measurement task, or that the strip density cannot be set accurately enough for the spatial evaluation. In such cases, the method includes the use of periodic structures for producing the object and/or reference wavefronts, said structures having defined phase jumps at at least one location in the field of the superimposition pattern. Exemplary possible implementations of such periodic structures with defined $\pi/2$ phase jumps are illustrated in FIGS. 2 to 4. Other predefined phase jumps are also possible, for example fractions of an integer period $2\pi \cdot p'/N'$ (with period number p' and step number N').

FIG. 2 shows a diffraction grating in the form of a one-dimensionally periodic line grid 4, the term "one-dimensionally" meaning that grid lines, symbolized by light and dark lines in FIG. 2, are arranged following one another in only one direction, from top to bottom in FIG. 2. A central square region of the line grid 4 is subdivided into four square subregions 4a, 4b; 4c, 4d, in which the line pattern is offset by defined phase jumps with respect to the surrounding line pattern. Specifically, in the bottom left subregion 4b, the line pattern is offset downward by $\pi/2$ as compared with the unshifted line pattern in the top left subregion 4a. The line pattern in the top right subregion 4d is offset upward by a phase jump of $\pi/2$ as compared with the unshifted line pattern in the top left subregion 4a. The line pattern in the bottom right subregion 4c is offset downward by a phase jump of $\pi/2$ as compared with the line pattern in the bottom left subregion 4b and, consequently, by a phase jump of $\pi$ as compared with the surrounding outer line pattern.

FIG. 3 shows schematically an interferometer mirror 5 which, in appropriate subregions 5a, 5b, 5c, is provided with layer additions for implementing respective $\pi/2$ phase jumps. Specifically, the layer addition shown in a front left subregion 5a effects a phase jump of $\pi/2$ as compared with the uncovered mirror surface. The layer addition twice as thick in a rear right subregion in turn effects a phase jump of $\alpha/2$ as compared with the front left subregion 5a and therefore of $\pi$ as compared with the uncovered mirror surface. The thickness of the layer addition in a rear left subregion 5c corresponds to three times the thickness of the layer addition in the front left subregion 5a and consequently implements a phase jump of $3\pi/2$ or $-\pi/2$ as compared with the uncovered mirror surface. Instead of elevations, depressions of the layer are also possible. The layers can also have outlines other than square ones.

The $\pi/2$ phase jumps described above in relation to the examples of FIGS. 2 and 3 are suitable in particular for the four-step method. For other method variants, other, suitable phase jumps can be implemented as required in an analogous way. The production of suitable phase jumps in respective subregions of a periodic structure is also possible in multi-dimensionally periodic structures, that is to say in structures which have periodically successive structure elements in a plurality of directions.

FIG. 4 shows, as an example of an application of this type, a two-dimensionally periodic diffraction grating in the form of a parceled parquet grid 6. The parquet grid 6 comprises two groups of square regions arranged alternately in the manner of parquet, a first group 7a to 7d with vertical grid lines in FIG. 4 and a second group 8a to 8d with horizontal grid lines in FIG. 4. In conventional parquet grid structures, the grid lines of the parquet squares are in phase among themselves in one group. Differing from this, in the parquet group 6 of FIG. 4, the grid lines of each of the two groups are offset with respect to each other from one to the next parquet square, both in the horizontal direction and in the vertical direction, in each case by a phase jump of $\pi$, the line patterns of each two diagonally adjacent parquet squares of the same group being offset by a phase jump of $\pi/2$. In other words, in FIG. 4, the vertical grids lines of the associated four parquet squares 7a to 7d in this order of the four squares are phase shifted by $\pi/2$ in each case in the counterclockwise direction and in the clockwise direction and this is correspondingly true of the grid lines of the four parquet squares 8a to 8d with horizontal grid lines in order in the counterclockwise direction and in the clockwise direction. The initial phases in the parquet cells can also be assigned in a different order. Likewise, other phase jumps can be selected instead of $\pi/2$.

FIG. 5 shows a variant with a checkerboard grid 9 as a two-dimensionally periodic diffraction grating with a plurality of parcels with offset checkerboard patterns. As can be seen from FIG. 5, the square checkerboard grid 9 is subdivided into four square parcels which have the same checkerboard pattern, but the checkerboard pattern being offset in a defined way, that is to say the result for the checkerboard grid 9 is defined initial phases and thus phase jumps in a manner analogous to the parquet grid 6 of FIG. 4.

After the phase step errors $\delta\phi_n$ have been determined in this way, the same are taken into account in a compensating manner in the evaluation of the initial phases in a next step 2 of the method sequence according to FIG. 1. For this purpose, in an advantageous implementation of the method, the apodisation weights $\omega_n$ are modified by means of additive correction contributions $\delta\omega_n$ in such a way that, irrespective of which initial phase is present, the complex Fourier sums do not change. In other words, the correction contributions $\delta\omega_n$ of the apodisation weights $\omega_n$ are determined from the following conditional equation, which applies to all the intensity values $I(\phi)$:

$$\sum_{n=1}^{N}(\omega_n + \delta\omega_n)I(\phi_n + \delta\phi_n) = \sum_{n=1}^{N}\omega_n I(\phi_n) \quad \forall\ I(\phi)$$

In the simplest case, this conditional equation is solved by approximation in linear disturbance theory, which is adequate for small phase step errors $\delta\phi_n$. For every harmonic component m of the periodic intensity signal $$I(\varphi) = \sum_{m} I_m \exp(im\varphi)$$

the modified Fourier sums and the disrupted Fourier sums are compensated, that is to say the following is true:

$$\sum_{n=1}^{N}\delta\omega_n \exp(im\phi_n) + im\sum_{n=1}^{N}\omega_n\delta\phi_n \exp(im\phi_n) = 0 \quad \forall\ m,$$

which gives the apodisation weight correction contributions $\delta\omega_n$ in the form $$\delta\omega_n = -\frac{i}{N}\sum_{n'=1}^{N}\omega_{n'}\delta\phi_{n'}\sum_{m} m\exp(im(\phi_{n'} - \phi_n))$$

Because of the Nyquist condition $-N/2p < m \leq N/2p$, the above determining equation for the apodisation weight correction contributions $\delta\omega_n$ is under-determined. From the many-valued solution, in the present case that one is specified which, with the effect of regularization, that is to say the lowest buildup of errors, sets the subgroups of modified weight values equal. In the same way, weighting with the magnitude $|\omega_n|$ is also possible, for example. As a further alternative, additional secondary conditions can be used which arise from the measurement task, in order to reduce the level of under-determination.

Following the determination of the correction contributions $\delta\omega_n$ to the complex apodisation weights $\omega_n$, in a final method step 3, the actual phase $\phi$ and therefore the object-induced phase difference between object and reference wavefronts for the respective location can be determined from the associated relationship as a function of the modified apodisation weights and the interferogram intensities. This phase information can be used further as required, for example in the context of a measurement of an optical imaging system for highly accurate determination of imaging errors, such as distortion and other aberrations. For this purpose, the chronologically successive phase shifts between object and reference wavefront needed for the phase shifting wavefront superimposition method are performed successively in time, for example in accordance with one of the conventional multi-step methods of a phase shifting interferometry technique (PSI).

As the above description of an advantageous embodiment makes clear, the method according to the invention combines the technique of time phase shifting, which offers comparatively high resolution, with spatial superimposition pattern evaluation, which is comparatively insensitive with respect to fluctuations within typical measurement periods. By means of the spatial superimposition pattern evaluation, phase shifting errors are determined, which are then corrected in the evaluation of the results from the phase shift measurements. The superimposition pattern formation comprises both the possibility of producing typical strip patterns and the use of specific initial phase variations in an appropriate object and/or reference structure, as are implemented, for example, in advanced parquet grid structures. The invention comprises both methods which are based on Moiré techniques and also those which employ actual interferometry techniques, such as lateral shearing interferometry. Furthermore, the invention comprises both variants with stepwise and also those with continuous phase shifts.

The invention claimed is:

1. A phase shifting wavefront superimposition method, comprising:

registering intensities ($I_n$) of superimposition patterns of object wavefronts and reference wavefronts for a predefined location, wherein the superimposition patterns are produced successively over time with respective phase shifts having predefined phase steps ($\phi_n$);

from the registered intensities, determining an object-induced phase difference ($\phi$) between the object wavefronts and the reference wavefronts for the location;

determining phase shift errors ($\delta\phi_n$) in the superimposition patterns produced successively by means of a spatial superimposition pattern evaluation; and correctively utilizing the determined phase shift errors in determining the object-induced phase difference ($\phi$).

2. The phase shifting wavefront superimposition method according to claim 1, wherein predefined phase jumps in an at least one-dimensionally periodic structure are used to provide at least one of the object wavefronts and the reference wavefronts.

3. The phase shifting wavefront superimposition method according to claim 1 or 2, wherein said correctively utilizing the phase shift errors in determining the object-induced phase difference comprises determining compensating correction contributions ($\delta\omega_n$) to apodisation weights ($\omega_n$) and using the apodisation weights in a relationship equation of the object-induced phase difference as a function of the superimposition pattern intensity.

4. The phase shifting wavefront superimposition method according to claim 1 or 2, wherein the method is configured as a phase shifting interferometry method for wavefront measurement of an optical imaging system.

5. A phase shifting wavefront superimposition method, comprising:

determining pattern intensities of temporally successive superimposition patterns of reference and object wavefronts for a predetermined location, where each successive pattern is obtained by phase shifting the object and reference wavefronts relative to one another;

determining phase shift errors in the temporally successive superimposition patterns using spatial superimposition pattern evaluation; and determining an object-induced phase difference between the object wavefronts and the reference wavefronts for the predetermined location from the pattern intensities and utilizing the determined phase shift errors for correction.

* * * * *